3,448,267
APPARATUS FOR INFRARED SCANNING HAVING A VARIABLE DETECTOR APERTURE AND A VARIABLE BANDWIDTH AMPLIFIER
Richard Blythe, Alvin E. Marshall, Claybourne Mitchell, Jr., George T. Oser, and Gerald C. Scott, Ann Arbor, Mich., assignors to The Bendix Corporation, a corporation of Delaware
Filed Oct. 27, 1965, Ser. No. 505,381
Int. Cl. G01t 1/16
U.S. Cl. 250—83.3          10 Claims

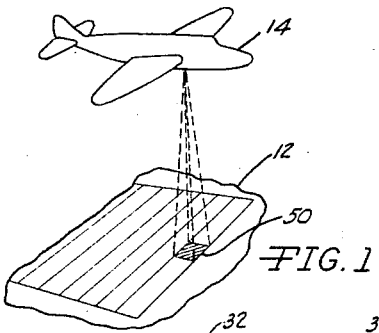
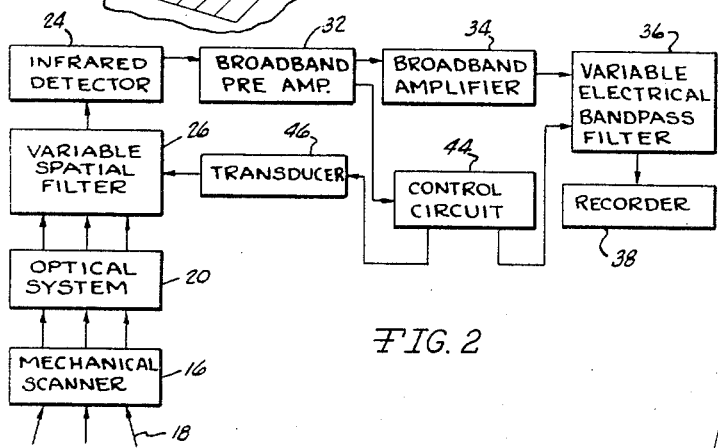
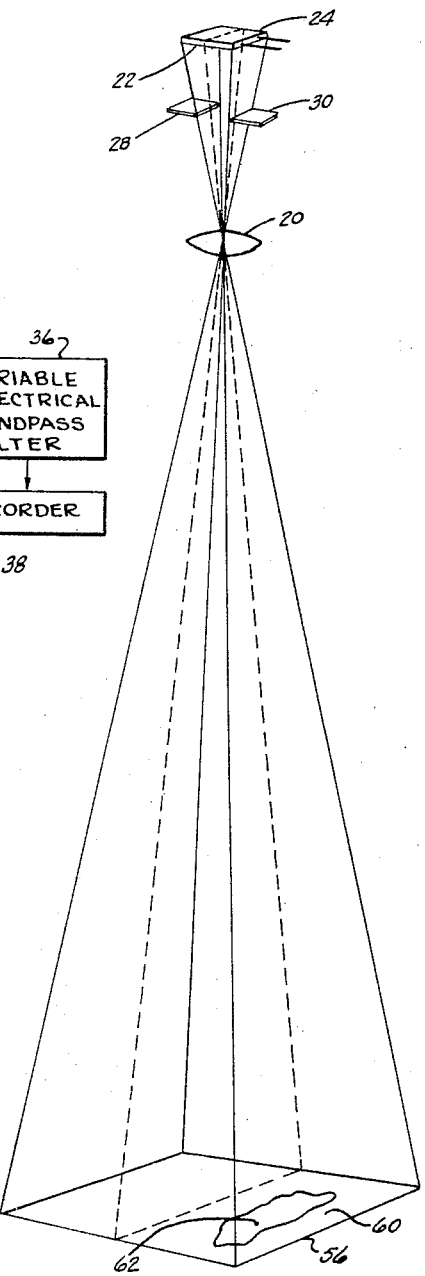
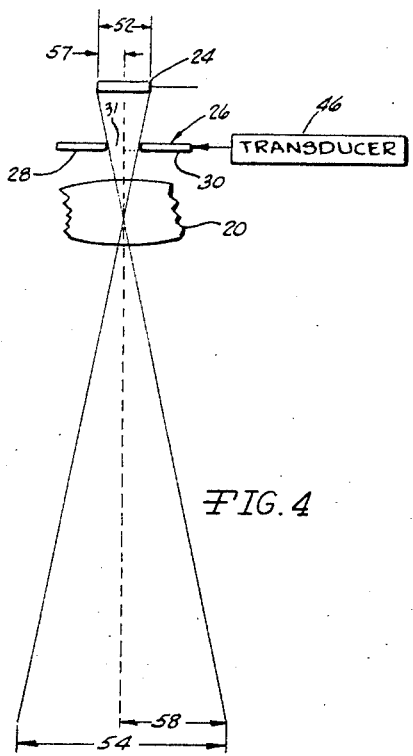
FIG. 1
FIG. 2
FIG. 4
FIG. 3
INVENTORS
RICHARD BLYTHE
ALVIN E. MARSHALL
CLAYBOURNE MITCHELL, JR.
GEORGE T. OSER
GERALD C. SCOTT
BY
ATTORNEY

United States Patent Office 3,448,267
Patented June 3, 1969

ABSTRACT OF THE DISCLOSURE

An infrared scanning apparatus having a detector aperture being variable in response to variations in radiation level and an amplifier connected to the detector output having a bandwidth which is also a variable response to radiation level.

---

This invention relates generally to infrared radiation detecting systems and more particularly to a method and an apparatus for infrared scanning.

An infrared scanning system carried in an airplane can be used to obtain infrared strip maps of terrain over which the airplane is flown. In general the infrared scanning system includes an infrared detector which responds to infrared radiation from a projected ground image of the detector as focused by an optical system. Typically the projected ground image is scanned across the terrain by rotating mirrors while an amplified detector output is recorded. The recorded data can later be processed for correlation with numerous parameters including the speed and altitude of the aiplane and the scanning rate of the mirrors to provide an infrared strip map.

With infrared detectors presently available, the efficiency of the detector increases as the size of the detector decreases. To obtain a detector output having a permissible signal-to-noise ratio detectors of very small size are used. For example a typical detector might have a maximum effective sensing area of three millimeters by three millimeters. In general the optical system is fixed to utilize the maximum effective sensing area and thus obtain an optimum signal-to-noise ratio. The system would also have an electrical bandwidth which is based on the scanning rate and upon the instantaneous angular resolution as determined by the optical system and the effective sensing area. Since the size of the ground resolution cell formed by the projected image, or stated differently, the spatial resolution of the scanning system, is a function of the optical system, the effective sensing area, and the electrical bandwidth, when these parameters are fixed undesirable limitations are imposed on the spatial resolution. Limitations on the spatial resolution impair the quality of the strip map since the resolution is constant in areas of both high and low radiation. For many applications it is desirable to improve the quality of the strip map and in accordance with the present invention it has been found that the quality can be improved by automatically varying the effective sensing area of the detector and the electrical bandwidth of the system either individually or simultaneously in accordance with the level of radiation.

Thus the objects of the present invention are to provide improved infrared scanning by a method and an apparatus that provide high quality data; that emphasize either resolution or contrast depending on the radiation level being received by the detector; and that are simple and effective.

In general this invention contemplates varying either the effective sensing area of the detector or the electrical bandwidth of the system, or preferably both, automatically as a function of an average ambient radiation level. Thus when the ambient radiation level is high, the electrical bandwidth will be increased and the effective detector area will be decreased, thereby increasing spatial resolution. Because the radiation levels are high, the signal in the detector output will increase proportionately more than the additional noise due to increasing the electrical bandwidth. Conversely when the ambient radiation level is low, the electrical bandwith will be decreased while the effective sensing area is increased, thereby reducing the resolution but increasing the contrast as compared to the areas of high resolution and thus achieving better detail in the finished strip map.

Other objects, features, and advantages of the present invention will become apparent from a consideration from the following description, the appended claims and the accompanying drawings in which:

FIGURE 1 diagrammatically illustrates aerial ground mapping by an airplane wherein the ground is scanned in lines for infrared radiation;

FIGURE 2 is a block diagram of an infrared scanning apparatus of the present invention which is useful in the aerial ground maping illustrated in FIGURE 1;

FIGURE 3 is a view schematically illustrating a ground resolution cell developed by the projected image of a detector which is focused by an optical system and further illustrating the effect of increasing the spatial resolution to pinpoint targets and areas of high radiation; and FIGURE 4 is a view illustrating a portion of the system of FIGURE 2 including an infrared detector, an optical system, and an optical stop which is varied in accordance with the average radiation level.

As illustrated diagrammatically in FIGURE 1, infrared radiation from ground terrain 12 may be detected and recorded by infrared scanning apparatus (FIGURE 2) carried in an airplane 14 flying over the terrain. Radiation from the ground 12 is scanned in lines transverse to the flight direction of airplane 14 and the recorded data can later be processed into an infrared strip map. In general the infrared scanning apparatus of the present invention comprises a mechanical scanner 16 which directs radiation, as illustrated by arrows 18, from along the scanning lines to an optical system 20 which focuses the radiation on a sensing area 22 (FIGURES 3 and 4) of an infrared detector 24. In accordance with one aspect of the present invention a variable spatial filter 26 is disposed along the optical path between the optical system 20 and the detector 24. Filter 26 comprises a fixed optical stop member 28 (FIGURE 4) and a movable optical stop member 30 that controls the size of an aperture 31 and thus controls an effective size of the sensing area 22. Detector 24 is cooled by suitable means (not shown) and stops 28, 30 are maintained at the temperature of detector 24.

Detector 24 develops an electrical signal (infrared video signal) which varies as a function of the level of radiation focused on area 22. Detector 24 may be indium antimonide with a maximum effective sensing area 22 of three millimeters by three millimeters. The signal developed by detector 24 is applied to a preamplifier 32 and then to an amplifier 34 to provide an amplified video signal. Amplifiers 32, 34 are broadband to be compatible with the highest frequency response of detector 24 at high resolution. For example, detector 24 and amplifiers 32, 34 may be operable to an upper cutoff frequency on the order of megacycles.

In accordance with another aspect of the present invention, the amplified viedo signal from amplifier 34 is applied to a variable electrical bandpass filter 36 which filters noise from the signal to produce an optimum signal-to-noise ratio. By way of illustration filter 36 may have a bandpass which varies from an upper cut-off frequency on the order of kilocycles to an upper cut-off frequency on the order of megacycles. The filtered output from filter 36 is applied to a recorder 38. Recorder 38 may be a conventional film recorder including conventional means for converting the electrical video signal to a light signal for recording on film.

A portion of the infrared video signal is also derived from amplifier 32 and applied to a control circuit 44 which develops a control signal representing the average radiation level at the detector 24. Circuit 44 may be a simple integrating circuit having a time constant selected in accordance with the particular scanning application. In general for aerial ground mapping, the video signal will be averaged over a time period that does not exceed the time for one scan line and preferably is substantially less than the time for one scan line. The control signal developed by circuit 44 is applied to the filter 36 to vary the bandpass of filter 36 in accordance with the average radiation level. Filter 36 may include any one of a number of signal responsive reactance elements such as voltage responsive capacitors or variable inductors. Equivalent electronic circuitry can also be used to obtain the required bandpass variations in filter 36 with variation in signal strength. A control signal developed by circuit 44 is also applied to an electrical-to-mechanical transducer 46 which in turn is coupled to the movable stop 30 in the spatial filter 36. The transducer 46 moves stop member 30 to cut off marginal portions of the radiation and thus vary the effective size of the sensing area 22 on detector 24 in accordance with the control signal and thus as a function of the average radiation level.

Referring to the operation of the scanning apparatus illustrated in FIGURE 2, as airplane 14 flies over the terrain 12 the optical system 20 and the mechanical scanner 16 project a ground image of the effective sensing area 22 as illustrated by the cross hatched ground area 50 (FIGURE 1). Radiation from the terrain 12 is scanned in lines, detected and converted into infrared video signals which are recorded on recorder 38. Assuming that the infrared radiation over several scan lines is low and that the movable stop 30 is in the open position illustrated in full lines in FIGURE 4, radiation will be projected over the maximum effective size 52 (FIGURE 4) of area 22 with an accompanying angular resolution 54 (FIGURE 4) and spatial resolution illustrated by the ground resolution cell 56 (FIGURE 3). Noise developed at the output of detector 24 varies with the radiation level and is a function of the maximum size of the detector sensing area 22. A maximum signal-to-noise ratio in the detector output is thus obtained when the maximum effective sensing area is used at low radiation levels. For low radiation filter 36 will present a selected low bandpass compatible with low resolution frequency components in the video signal so that the filtered output has an optimum signal-to-noise ratio. When higher radiation is encountered in subsequent scan lines the video output at detector 24 increases which in turn causes the control signal from circuit 44 to vary in proportion to the average value of the higher level radiation. The control signal from circuit 44 at high radiation levels causes transducer 56 to close stop 30 as illustrated in dashed lines and stop down the effective size sensing area 22 as designated by numeral 57. This in turn increases the angular resolution as designated by numeral 58 to achieve a higher spatial resolution as illustrated by the smaller resolution cell 60 (FIGURE 3). Simultaneously the bandpass of filter 36 is increased by the control circuit 44 to be compatible with the size of the resolution cell 60 and pass high frequency components incident to the higher resolution. Because the radiation level is high, the signal-to-noise ratio in the video output of detector 24 remains high even though the effective size of area 22 is decreased. Additionally the signal-to-noise ratio in the filtered output of filter 36 remains high since the video signal will increase proportionally more than additional noise due to increasing the bandpass of filter 36. With increased resolution the infrared scanning apparatus can pinpoint a target and areas of high radiation designated by numeral 62 (FIGURE 3). Thus by automatically varying the effective size of the sensing area 22 and varying the bandpass of filter 36, spatial resolution is increased with increasing radiation levels and by means of this technique, the relative contrast is increased with decreasing radiation levels. With the infrared scanning method and apparatus of the present invention high quality strip maps of increased sharpness and definition can be obtained.

Although in the preferred embodiment of the present invention illustrated in FIGURE 2, the control signal is developed in response to a portion of the infrared video output from amplifier 32, various modifications will be readily apparent. For example, a portion of the signal from detector 24 or from the amplifier 36 can be used to develop an average value control signal. Separate control circuits for the spatial filter 26 and the electrical filter 36 could be used. For example, a self adaptive electrical filter is contemplated where the bandpass varies directly as a function of the signal level applied to the filter. Control is also contemplated from the infrared radiation directly rather than from the detected video signal although the latter is more efficient and is preferred since the control can be derived with only nominal expense to the signal. The spatial filter 26 may be in the form of an iris diaphram to vary the effective size of area 22 equally in all directions. The transducer 46 can be a simple meter type movement since very little torque is required to move the optical stop 30.

It will be understood that the method and apparatus for infrared scanning herein disclosed and described are presened for purposes of explanation and illustration and are not intended to indicate limits of the invention, the scope of which is defined by the following claims.

What is claimed is:

1. In an infrared scanning apparatus wherein infrared radiation from a source is scanned and then converted by a detector having a sensing area into an electrical signal which varies in accordance with variation in radiation level, means directly responsive to variation in said radiation level to provide a control signal, means operable in response to said control signal to vary the effective size of said sensing area in accordance with variation in said radiation level and means operatively coupled to said electrical signal and responsive to said control signal to vary a frequency bandwidth of said electrical signal in accordance with variation in said radiation level.

2. The apparatus of claim 1 wherein said first mentioned means responsive to said control signals is operative to decrease said sensing area when said radiation level increases and conversely to increase said sensing area when said radiation level decreases and wherein said second mentioned means responsive to said control signal is operative to increase said bandwidth when said radiation level increases and conversely to decrease said bandwidth when said radiation level decreases.

3. In an infrared scanning apparatus wherein infrared radiation from a source is scanned and then converted by an infrared detector having a sensing area into an electrical signal, first means operable in direct response to a variation in radiation level to vary the effective size of said area and second means operable in response to a variation in radiation level to vary the frequency bandwidth of said electrical signal.

4. An infrared scanning apparatus comprising infrared detector means having a sensing area, optical means for projecting an image of said detector area, means for scanning said projected image over a source of infrared radiation, said detector means being responsive to radiation from said image as said source is scanned to develop an electrical signal having an amplitude which varies in accordance with variation in radiation level, said electrical signal having frequency components in a frequency bandwidth related to the size of said projected image, amplifier means operable in response to said electrical signal over a broad frequency range to provide an amplified electrical signal, first circuit means operatively coupled in said scanning apparatus to develop a control signal which varies in accordance with an average radiation level at said area, means operatively coupled in said optical means and responsive to said control signal to vary the effective size of said sensing area in accordance with said average radiation level, and variable frequency bandpass means operatively coupled to said amplifier means to receive said amplified signal and operative in response to said control signal to vary the bandwidth of frequency components in said amplified signal in accordance with said average radiation level.

5. An infrared scanning apparatus comprising infrared detector means having a sensing area, optical means for projecting an image of said detector area, means for scanning said projected image over a source of infrared radiation, said detector means being responsive to radiation from said image as said source is scanned to develop an electrical signal having an amplitude which varies in accordance with variation in radiation level, amplifier means operable in response to said electrical signal over a broad frequency range to provide an amplified electrical signal, first circuit means operatively coupled in said scanning apparatus to develop a control signal which varies in accordance with an average radiation level at said area, and means operatively coupled in said optical means and responsive to said control signal to vary the effective size of said sensing area in accordance with said average radiation level.

6. The apparatus set forth in claim 5 wherein said detector means has a maximum effective sensing area, said optical means projects an image of said maximum sensing area for a low average radiation level and said means for varying the size of said effective sensing area comprises optical stop means disposed in front of said sensing area an operable to cut off a marginal portion of said projected image and thereby decrease the effective size of said sensing area for a high average radiation level.

7. An infrared scanning apparatus comprising infrared detector means having a sensing area, optical means for projecting an image of said detector area, means for scanning said projected image over a source of infrared radiation, said detector means being responsive to radiation from said image as said source is scanned to develop an electrical signal having an amplitude which varies in accordance with variation in radiation level, said electrical signal having frequency components in a frequency bandwidth related to the size of said projected image, amplifier means operable in response to said electrical signal over a broad frequency range to provide an amplified electrical signal, first circuit means operatively coupled to said scanning apparatus to develop a control signal which varies in accordance with an average radiation level at said area, and variable frequency bandpass means operatively coupled to said amplifier means to receive said amplified signal and operative in response to said control signal to vary the bandwidth of frequency components in said amplified signal in accordance with said average radiation level.

8. The apparatus set forth in claim 7 wherein said detector means and said amplifier means has a maximum upper cut-off frequency compatible with high resolution and said variable bandpass means comprises a filter variable between an upper cut-off frequency below said maximum frequency for low resolution and a higher upper cut-off frequency for high resolution.

9. In an infrared scanning apparatus wherein infrared radiation from a source is scanned and then converted by a detector having a sensing area into an electrical signal which varies in accordance with variation in radiation level, means responsive to variation in said radiation level to provide a control signal directly representative thereof, and means operable in response to said control signal to vary the effective size of said sensing area in accordance with variation in said radiation level such that said sensing area decreases when said radiation level increases and conversely said sensing area decreases when said radiation level decreases.

10. In an infrared scanning apparatus wherein infrared radiation from a source is scanned and then converted by a detector into an electrical signal which varies in accordance with variation in radiation level, means directly responsive to variation in said radiation level to provide a control signal, and means operably coupled to said electrical signal and responsive to said control signal to vary a frequency bandwidth of said electrical signal in accordance with variation in said radiation level such that said electrical bandwidth decreases when said radiation level decreases and conversely said electrical bandwidth increases when said radiation level increases.

References Cited

UNITED STATES PATENTS

| | | | |
|---|---|---|---|
| 3,076,189 | 1/1963 | Goddard | 250—83.3 X |
| 3,191,035 | 6/1965 | Brumfield et al. | 250—83.3 |
| 3,204,100 | 8/1965 | Wormser et al. | 250—83.3 |

RALPH G. NILSON, *Primary Examiner.*

SAUL ELBAUM, *Assistant Examiner.*

U.S. Cl. X.R.

250—204; 244—1